Patented June 5, 1923.

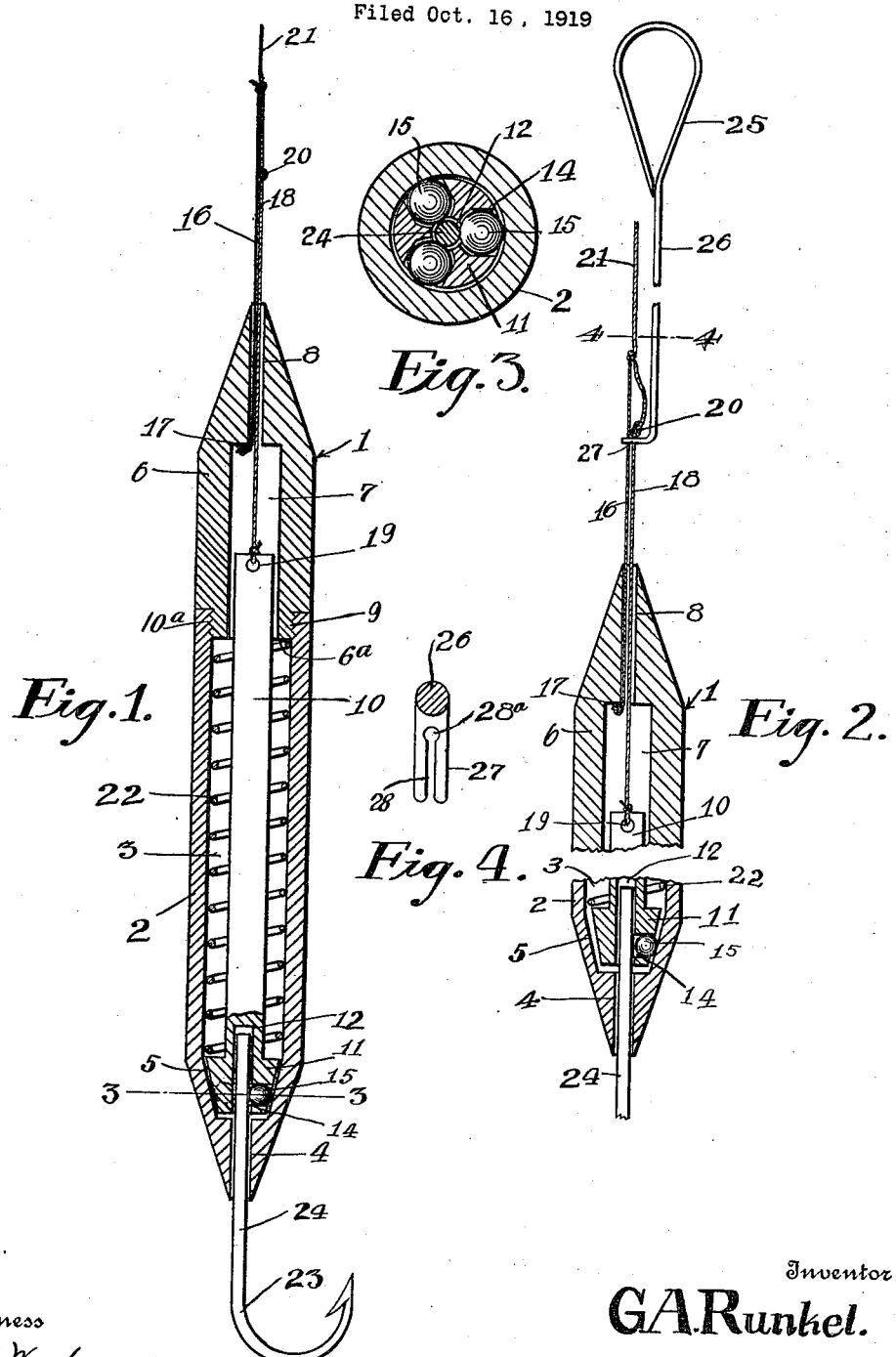

1,457,550

UNITED STATES PATENT OFFICE.

GRANT A. RUNKEL, OF LANCASTER, PENNSYLVANIA.

DETACHABLE FISHHOOK.

Application filed October 16, 1919. Serial No. 331,158.

*To all whom it may concern:*

Be it known that I, GRANT A. RUNKEL, a citizen of the United States, residing at Lancaster, in the county of Lancaster and State of Pennsylvania, have invented a new and useful Detachable Fishhook, of which the following is a specification.

It is an object of this invention to provide novel means whereby one fish hook may be substituted readily for another in the operation of fishing and to provide means whereby at the will of an operator, the hook may be left in the fish when the hook is swallowed, the construction being such that it is unnecessary to tear the guts out of the fish, when, owing to game laws or otherwise, the fisherman desires to return the fish to the water, alive and in good condition.

The conditions above alluded to exist now and then, but even when the fish is hooked in the mouth, it is easier to thread the hook out barb first than to withdraw the hook in the usual way, the barb being pulled backwardly, and the invention aims to provide novel means whereby the hook may be detached, to the end that it may be removed barb first, as aforesaid.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts appearing in elevation, the device being arranged as it will appear while the fish hook is gripped;

Figure 2 is a view similar to Figure 1, parts being broken away, the device being arranged as it will appear when the shank of the fish hook is released with the aid of a disgorger; and Figure 3 is a cross section taken on the line 3—3 of Figure 1.

Figure 4 is a cross section of the disgorger.

In carrying out the invention there is provided a body 1, which if desired, may constitute a sinker. The body may be altered however to simulate the appearance of bait, of any kind. The body 1 includes a lower member 2 having a chamber 3 and provided at its lower end with a passage 4, there being a tapered bore 5 between the chamber and the passage. The body 1 comprises an upper member 6 having a chamber 7, and a passage 8 in its upper end. The lower end of the member 6 is reduced as shown at 9 and is threaded at $10^a$, into the upper end of the lower member 2, the lower end of the member 6 forming a shoulder $6^a$ in the body 1.

A plunger 10 is provided, the same being located in the chamber 3 of the lower member 2 and extending upwardly into the chamber 7 of the upper member 6, the plunger being provided at its lower end with a tapered head 11 corresponding in shape to the tapered bore 5 of the lower member 2. The lower end of the head 11 is provided with an axial opening 12 communicating with lateral openings 14 in the head, the openings being shown in Figs. 1, 2 and 3. Balls 15 or other antifriction elements are mounted in the lateral openings 14.

A main line 16 is extended downwardly through the passage 8 of the upper member 6 and is provided at its lower end with an enlargement 17, which, cooperating with the upper member 6 at the upper end of the recess or chambers, prevents the line 16 from being withdrawn. The numeral 18 marks an auxiliary line extended downwardly through the passage 8 of the upper member 6 and secured in an opening 19 formed in the upper end of the plunger 10. Externally of the body 1, the auxiliary line 18 is provided with a knot or other enlargement 20 (see Fig. 2). It may be found convenient to fashion the auxiliary line 18 and the main line 16 from snells to the end that they may slide freely in the passage 8 of the upper member 6. The lines 16 and 18 may be connected at their upper ends to a line 21.

A compression spring 22 is located in the chamber 3 of the lower member 2, one end of the spring abutting against the shoulder $6^a$ of the upper member 6, and the other end of the spring abutting against the head 11 of the plunger 10. The numeral 23 designates a hook, including a shank 24 extended upwardly through the passage 4 of the lower member 2 and into the opening 12 in the lower end of the plunger 10.

In practical operation, assuming that the parts are arranged as shown in Figure 1, the spring 22 pushes the plunger 10 downwardly, the balls 15 cooperating with the tapered bore 5 and being forced inwardly, the balls bearing against the shank 24 of the hook 23, the hook thus being held in the body 1. The balls 15 cannot rotate, when a pull is exerted on the hook 23, because the balls bear against the walls of the tapered bore 5, as shown in Figure 3.

In order to release the hook 23, the plunger 10 is pulled upwardly by means of the auxiliary line 18 and the spring 22 is put under compression. The balls 15 no longer are pressed against the wall of the tapered bore 5 of the lower member 2 and against the shank 24 of the hook 23. Consequently, the hold of the balls 15 on the shank 24 of the hook 23 is released.

If the device is accessible and held in the fingers, the auxiliary line 18 may be pulled upwardly by the fingers of the fisherman. However if, the hook 23 and the body 1 have been swallowed by the fish, then recourse may be had to a disgorger 25, including a stem 26 having a transverse foot 27 provided with a slot 28 merging into an enlargement 28ª. The foot 27 of the disgorger 25 is inserted down the gullet of the fish, and the line 18 is engaged in the slot 28, the foot 27 being below the knot 20, the knot being large enough so that it cannot pass through the enlargement 28ª, the enlargement forming a seat for the knot. A pull then is exerted on the line 18, by means of the disgorger 25, the plunger 10 is retracted, and the hook 23 is released. The lines 21 and 16 are drawn taut and the foot 27 of the disgorger is slid along the taut lines 21 and 16 until the foot of the disgorger rests against the end of the part 6, whereupon the disgorger and the body 1 may be withdrawn from the body of the fish, a withdrawal taking place more readily when the foot 27 is engaged with the body, than when a length of line intervenes between the body 1 and the foot 27 of the disgorger.

The construction of the device is such that one hook may be substituted for another of a different size, should occasion demand. The disgorger 25 may be used to release the hook and to leave the same in the fish, it being a matter of common knowledge that a hook often will work out of the body of a fish without injuring the fish, whereas it is equally well known that if the hook is torn out, the fish either will be killed or will be injured to such an extent that it will die after having been restored to the water.

It will be understood that the auxiliary line 18 is of sufficient length relative to the line 16 so that when the plunger is advanced by the spring 22 to cause the balls 15 to grip the shank 24 of the hook 23, said line 18 will not become taut before the balls 15 have been advanced by cooperation with the tapered bore 5, to cause the balls to grip the shank of the hook.

I claim:

1. In a device of the class described, a body; a hook-gripping means carried by the body; a fish hook held releasably by the hook-gripping means; and lines connected to the body and to the hook-gripping means, the line which is connected to the hook-gripping means being effective to release the hook-gripping means from the hook, when a fish has swallowed the body and the hook.

2. In a device of the class described, a body having a bore; a plunger slidable in the bore and provided with hook-gripping means, the bore and the plunger being mutually tapered to cause the hook-gripping means to act when the plunger is advanced; and lines connected, respectively, with the body and the plunger, one line constituting means for retracting the plunger.

3. In a device of the class described, a body having a bore; a plunger slidable in the bore and provided with hook gripping means, the bore and the plunger being mutually tapered to cause the hook gripping means to act when the plunger is advanced; lines connected, respectively, with the body and with the plunger, one line constituting means for retracting the plunger; and a third line whereunto both of the aforesaid lines are attached.

In testimony that I claim the foregoing as my own, I have hereto affixed my signature in the presence of two witnesses.

GRANT A. RUNKEL.

Witnesses:
W. B. HOAR,
HELEN H. SWARTZ.